Figures 8, 9, 10:
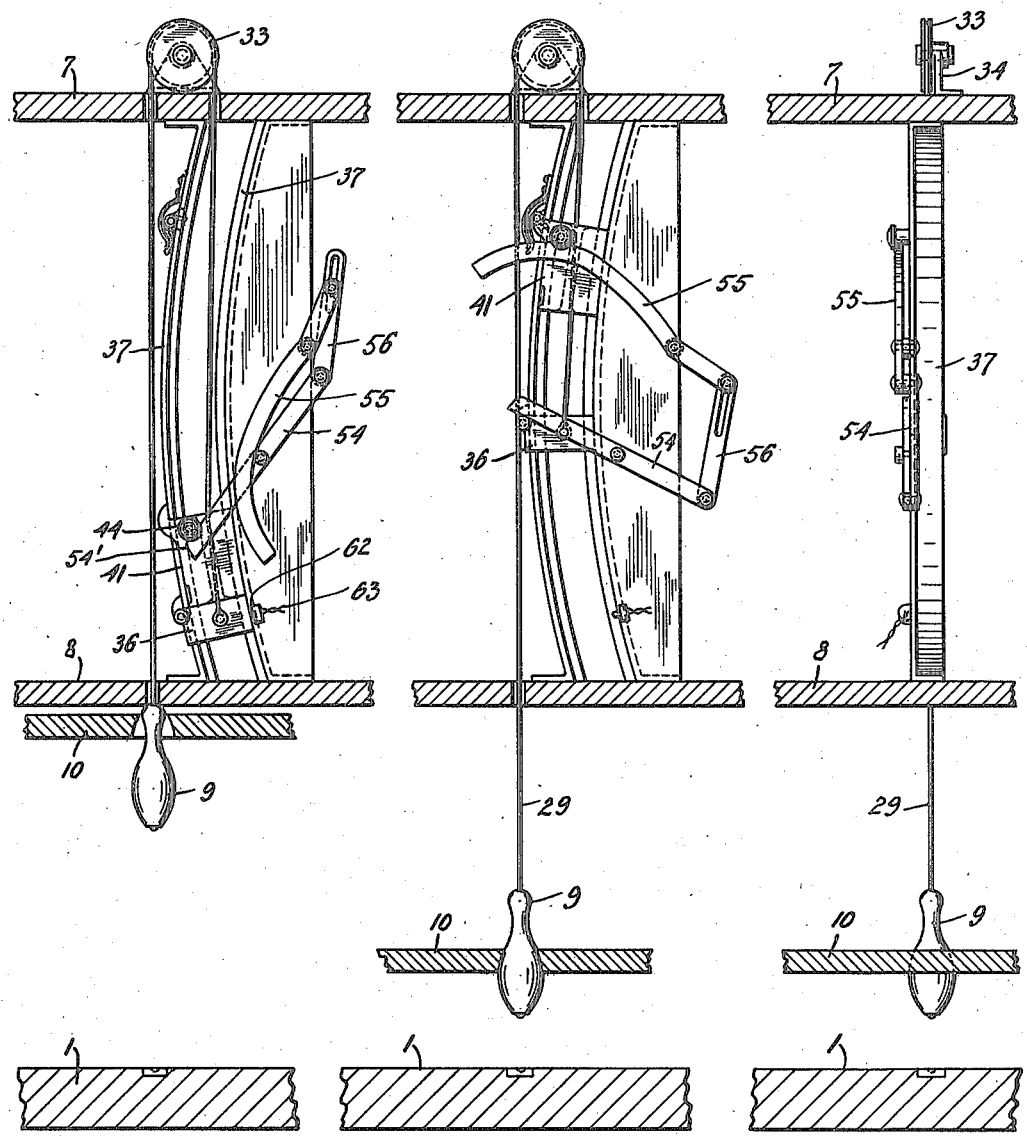

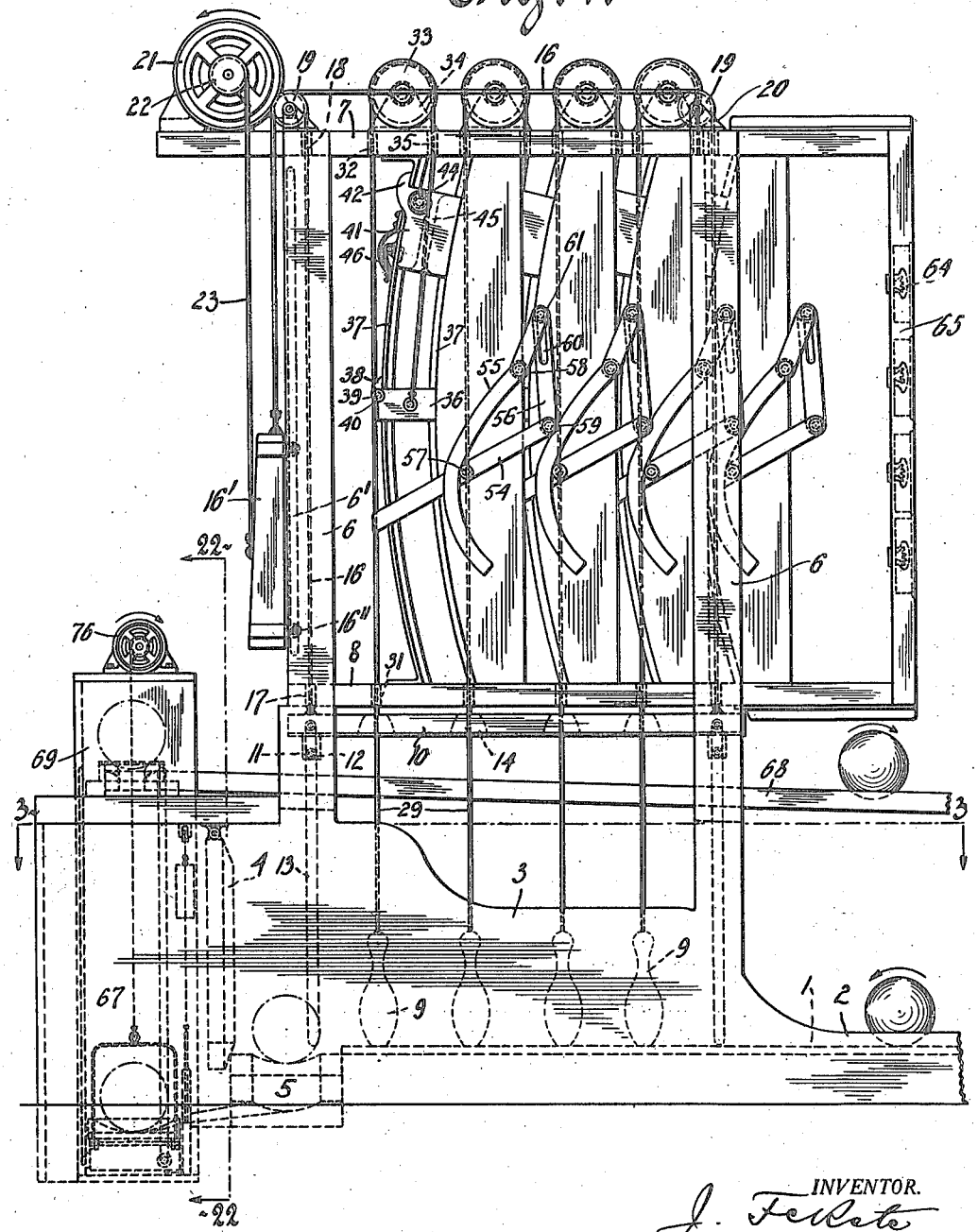

J. FEKETE.
BOWLING ALLEY.
APPLICATION FILED NOV. 15, 1917.
1,263,875.
Patented Apr. 23, 1918.
10 SHEETS—SHEET 2.
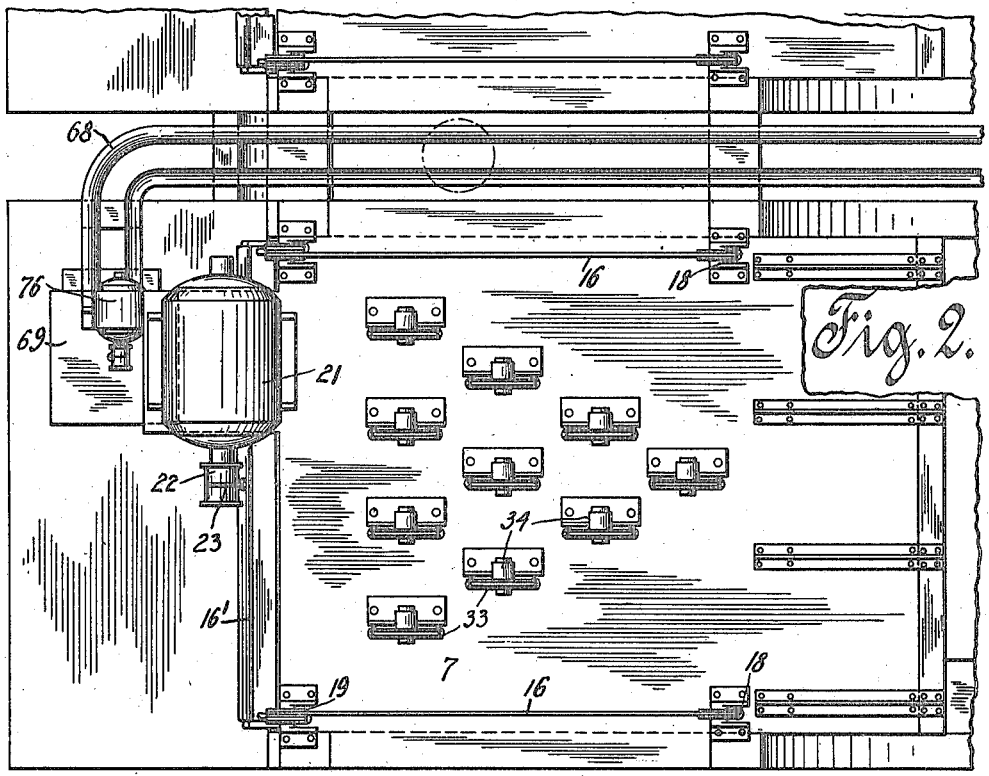
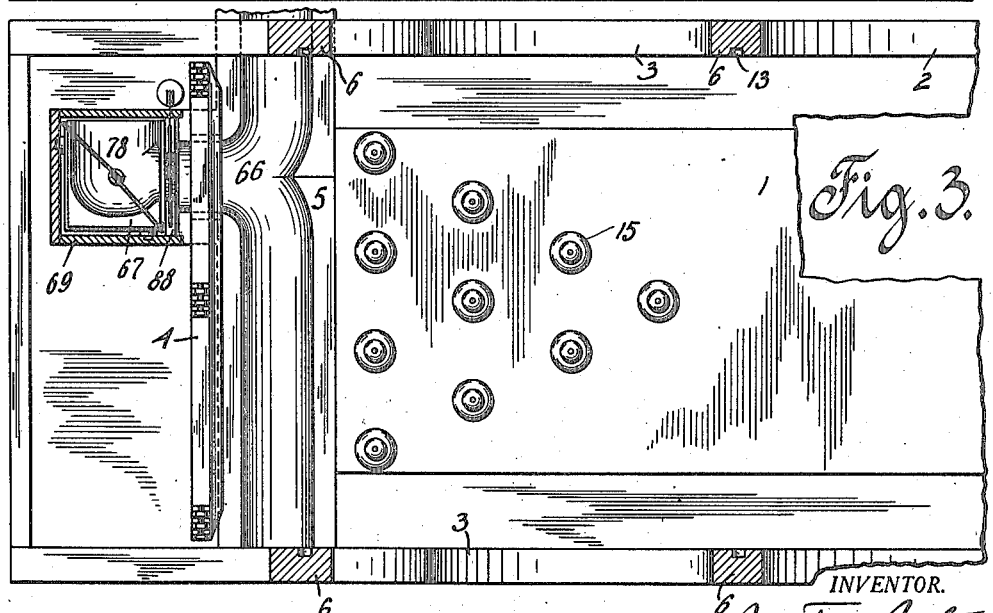
INVENTOR.
J. Fekete
BY Sigmund Herzog
his ATTORNEY

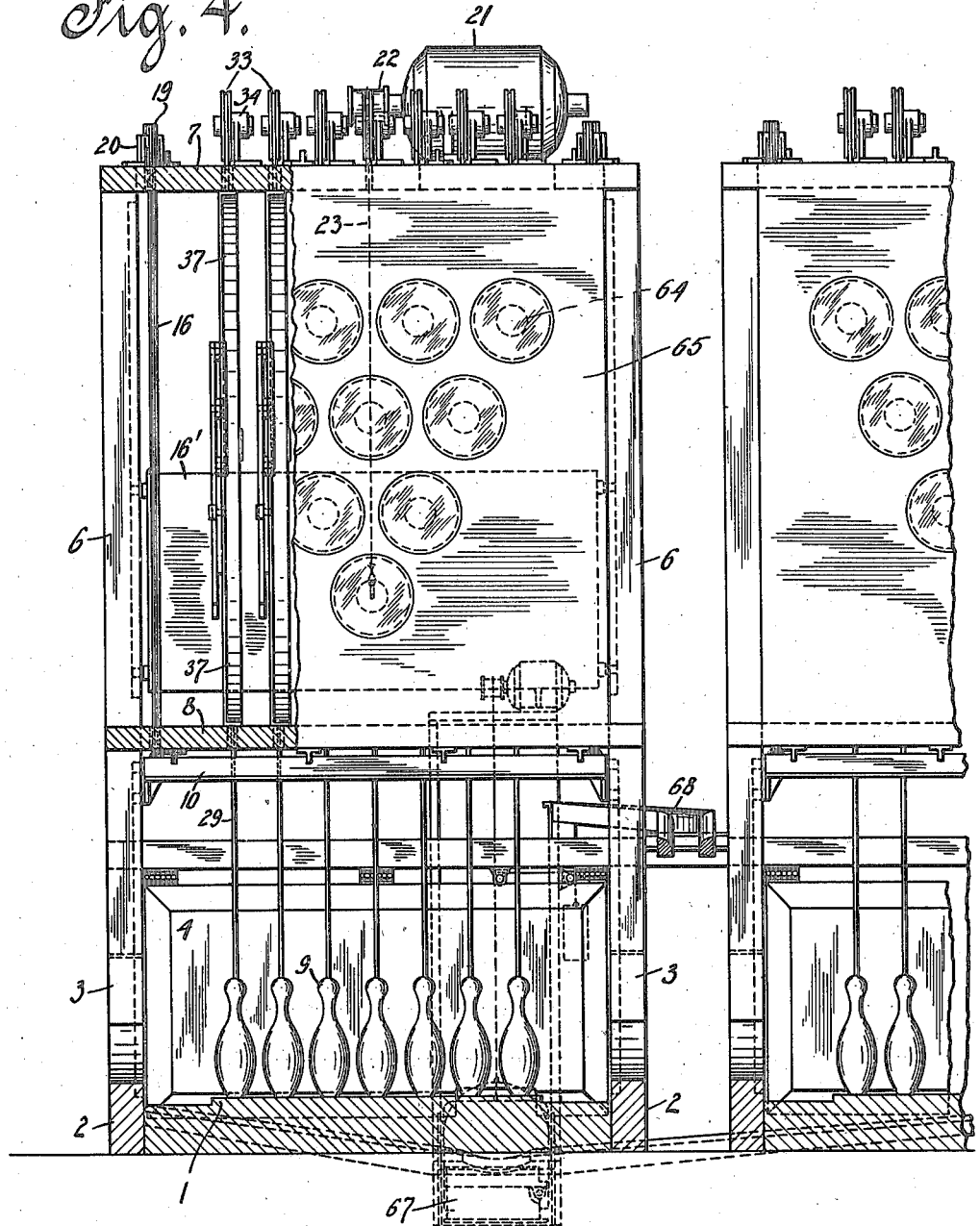

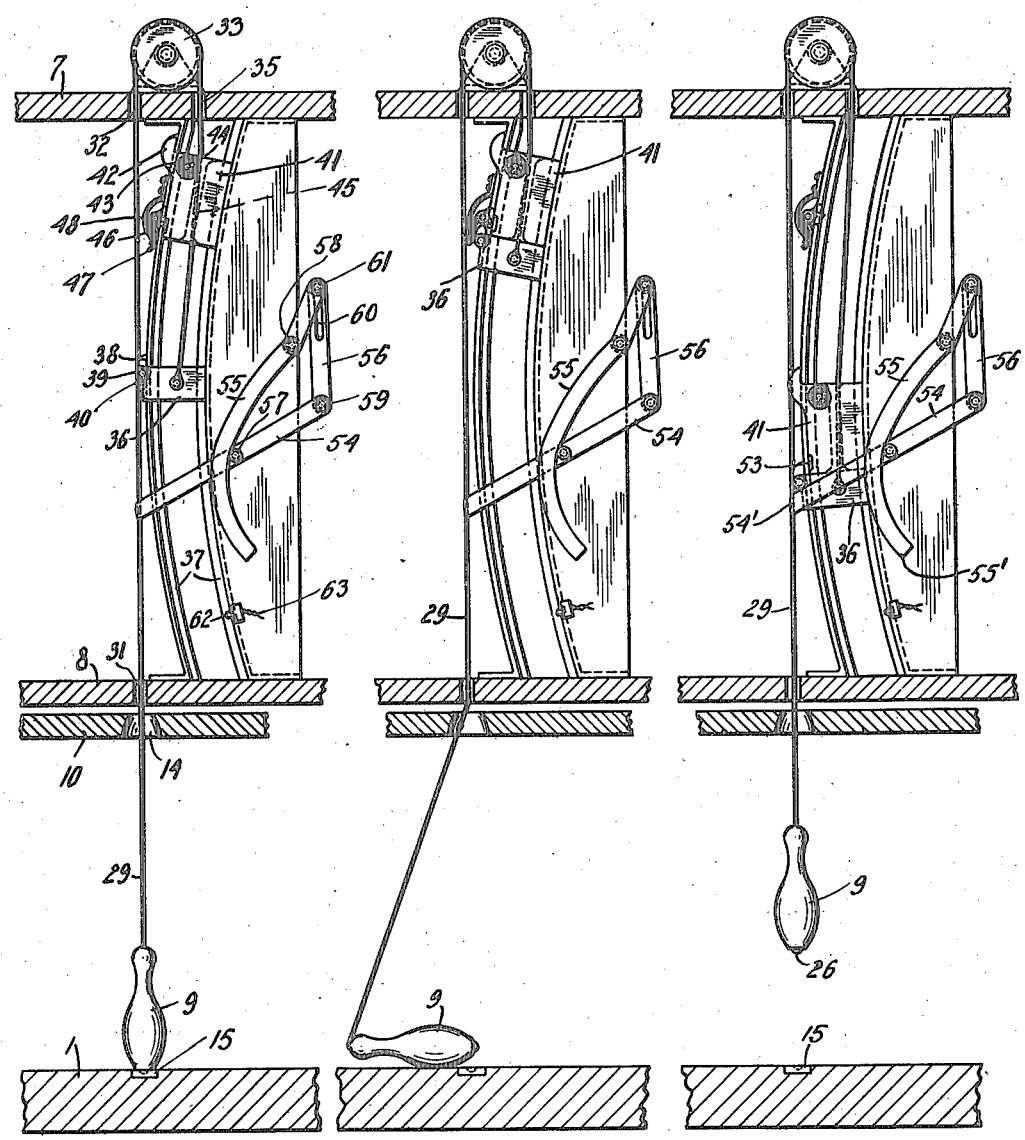

J. FEKETE.
BOWLING ALLEY.
APPLICATION FILED NOV. 15, 1917.

1,263,875.

Patented Apr. 23, 1918.
10 SHEETS—SHEET 5.

INVENTOR.
J. Fekete
BY
his ATTORNEY

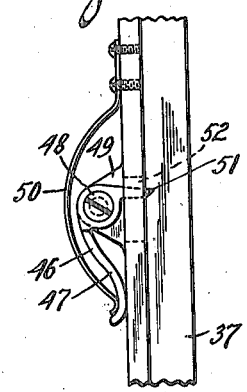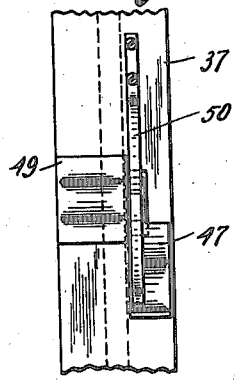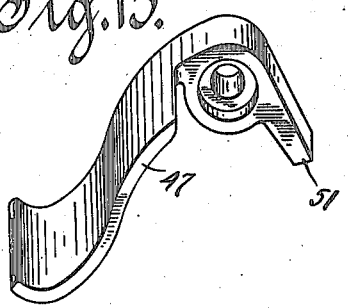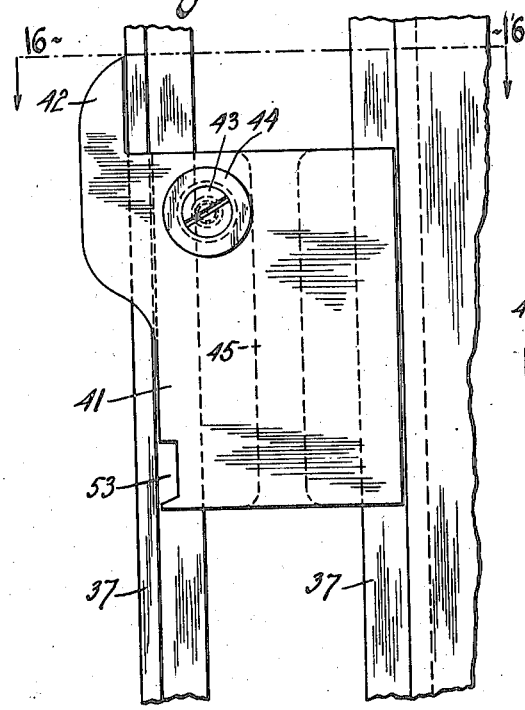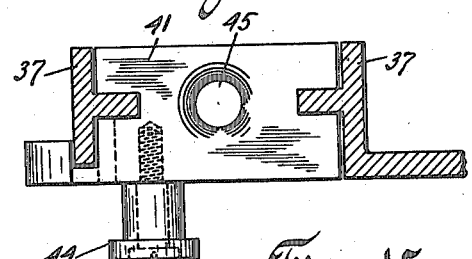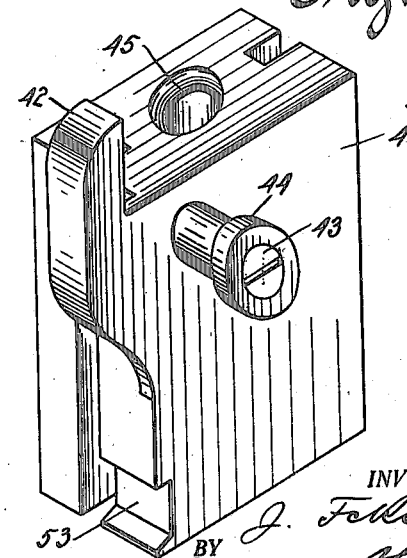

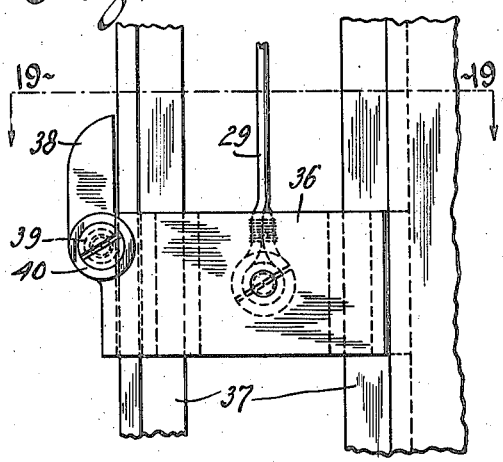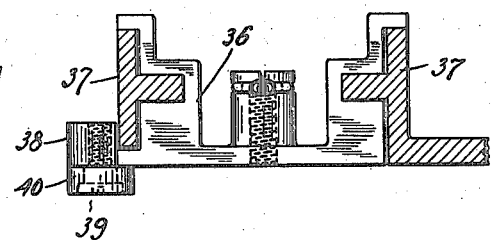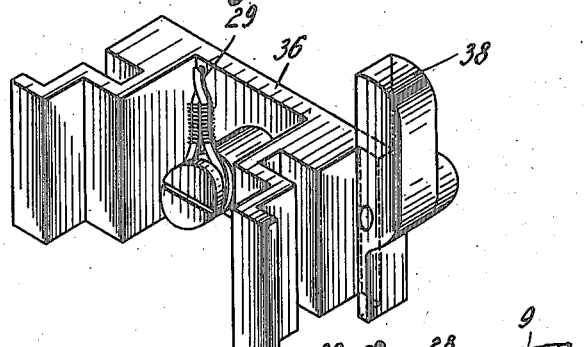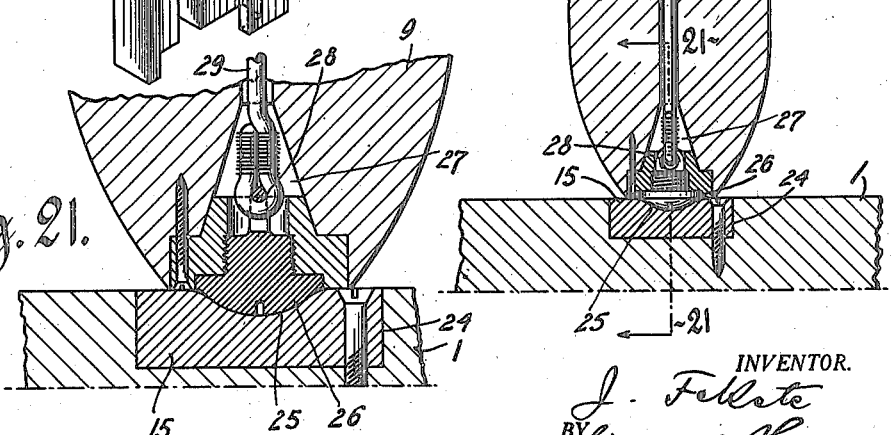

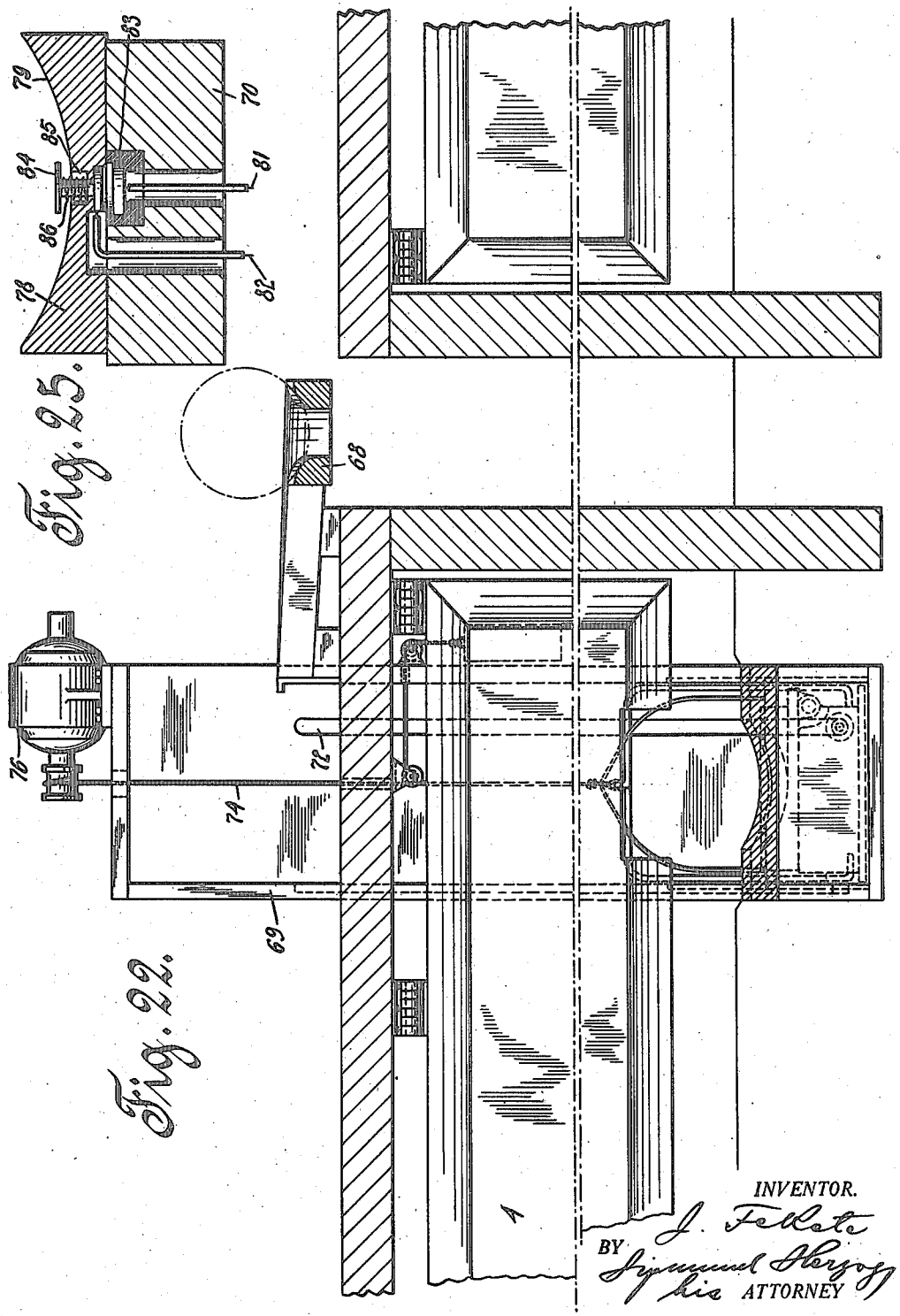

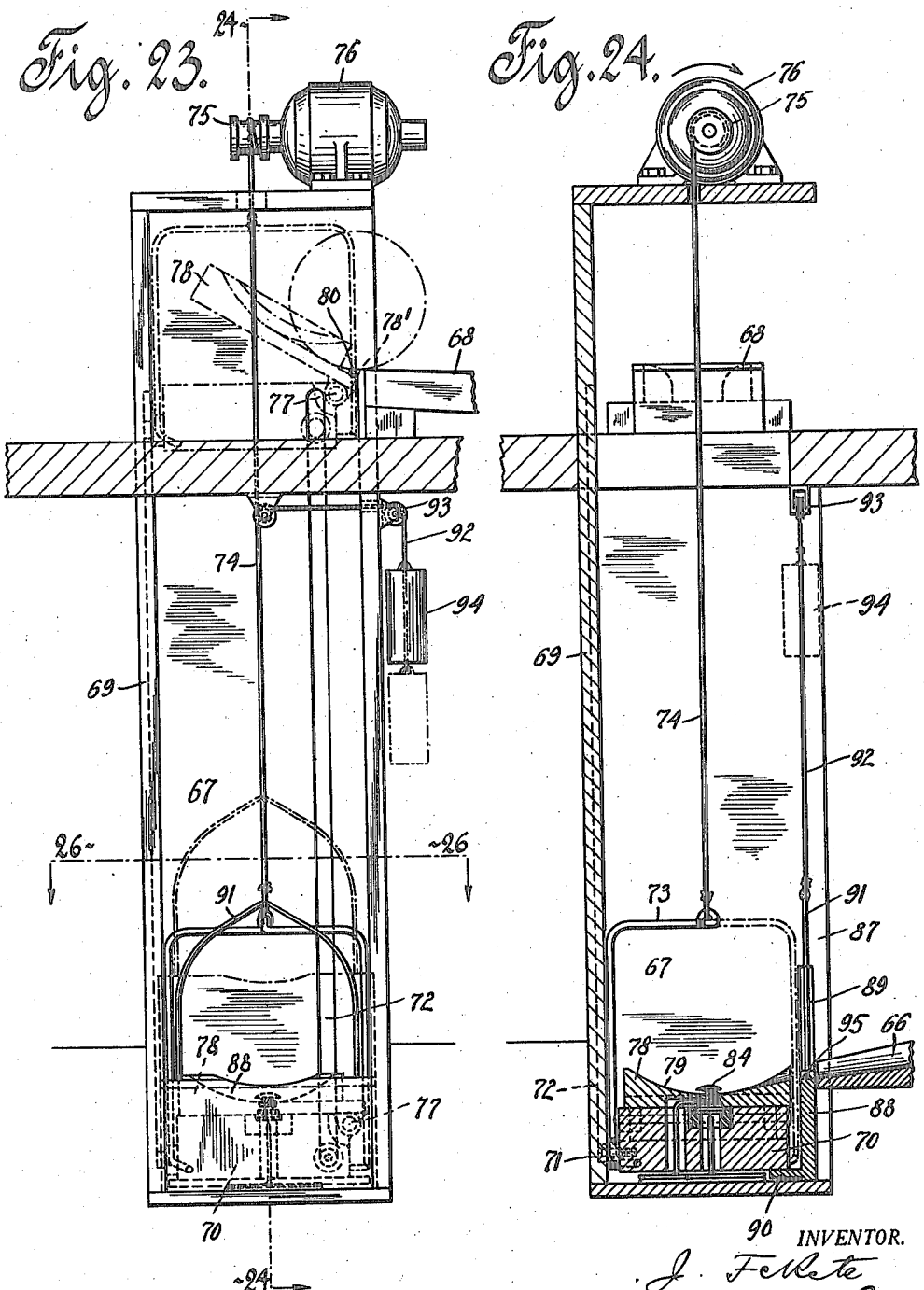

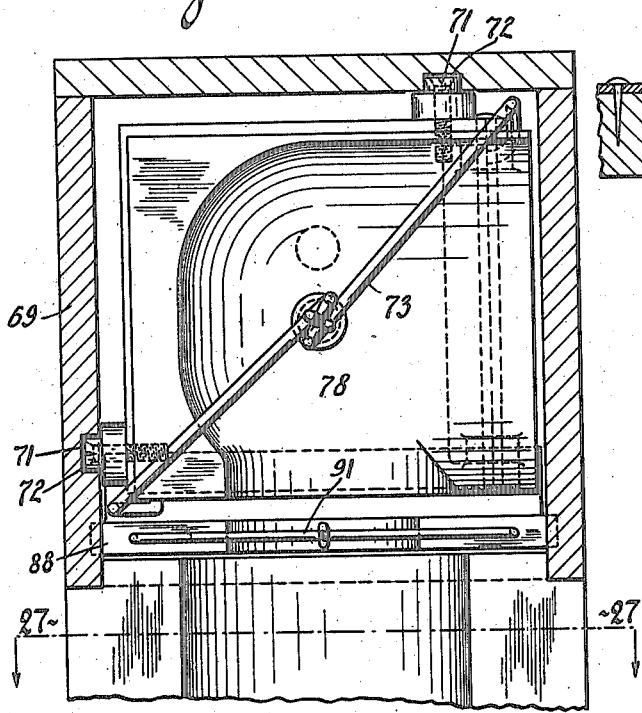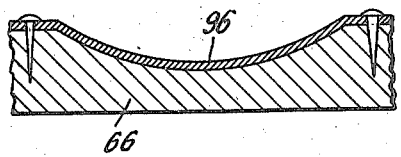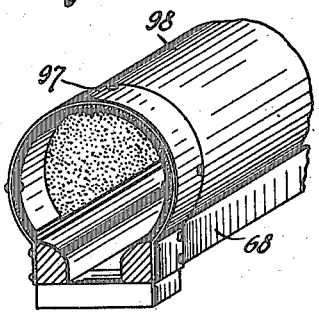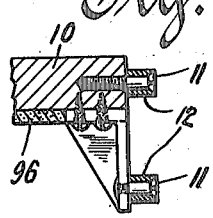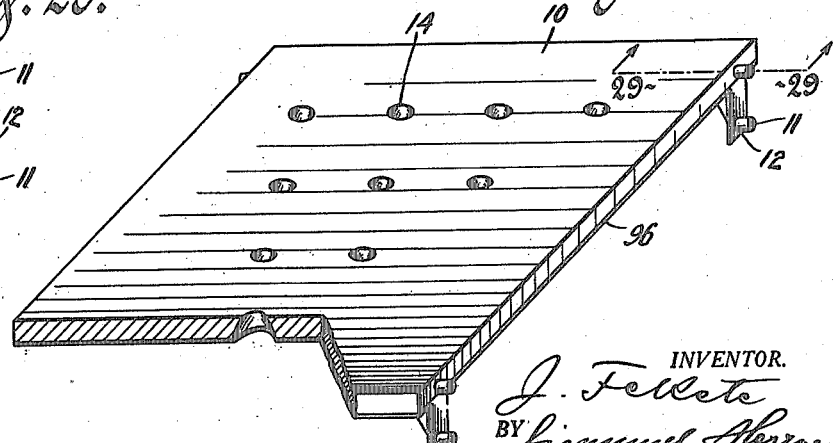

UNITED STATES PATENT OFFICE.

JULIUS FEKETE, OF NEW YORK, N. Y.

BOWLING-ALLEY.

1,263,875.

Specification of Letters Patent.   Patented Apr. 23, 1918.

Application filed November 15, 1917.  Serial No. 202,251.

*To all whom it may concern:*

Be it known that I, JULIUS FEKETE, a citizen of the United States, and a resident of the city of New York, in the county of New York and State of New York, have invented certain new and useful Improvements in Bowling-Alleys, of which the following is a specification.

The present invention relates to improvements in bowling alleys.

One of the objects of the invention is to produce a pin setting apparatus which is simple, compact and that can be conveniently mounted on the side frames of a bowling alley.

Another object of the invention is to construct a pin setting apparatus which is positive in operation and properly delivers pins to the spots, the device being adapted to be actuated from a distant point, for instance from the players' end of the alley.

A further object of the invention is to so construct the pins and spots that extreme accuracy in setting up of the apparatus is unnecessary.

A still further object of the invention is to provide means which automatically returns the balls to the point of delivery, that is to say to the bowlers' stand.

Another further object of the invention is to so construct a bowling alley, that unnecessary noises are avoided in bowling.

A further object of the invention is to devise means, whereby the balls are properly cleaned as they return from the pit to the bowlers' stand.

Another object of the invention is to provide means which indicates automatically the particular pin or pins which have been struck and knocked from their vertical position by means of the balls.

A further object of the invention is to actuate both the pin setting device and the ball returning means electrically.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a side elevation of a bowling alley constructed in accordance with the present invention; Fig. 2 is a top plan view thereof; Fig. 3 is a section taken on line 3—3 of Fig. 1; Fig. 4 is a front elevation of the same, partly in section; Figs. 5 to 9, inclusive, are side elevations of an individual setting mechanism, in different positions; Fig. 10 is a front elevation of the device shown in Fig. 9; Fig. 11 is a side elevation, on a larger scale, of a spring pressed latch and frame, forming part of the setting mechanism; Fig. 12 is a rear elevation of the device shown in Fig. 11; Fig. 13 is a perspective view of a detail of the device shown in Figs. 11 and 12; Fig. 14 is a side elevation, on a larger scale, of a weight and frame coöperating with the latch mechanism shown in Figs. 11 to 13 inclusive; Fig. 15 is a perspective view of the said weight; Fig. 16 is a section taken on line 16—16 of Fig. 14; Fig. 17 is a side elevation of a slide and its guides, on a larger scale, coöperating with the pins; Fig. 18 is a perspective view of the said slide; Fig. 19 is a section taken on line 19—19 of Fig. 17; Fig. 20 is a vertical section taken through a pin constructed in accordance with this invention and the pin spot coöperating therewith; Fig. 21 is a similar section, on a larger scale, taken through the pin and pin spot; Fig. 22 is a section taken on line 22—22 of Fig. 1, on a larger scale; Fig. 23 is a similar section showing the elements in other positions; Fig. 24 is a section taken on line 24—24 of Fig. 23; Fig. 25 is a detail, on a larger scale, of the device shown in Fig. 24; Fig. 26 is a section taken on line 26—26 of Fig. 23, on a larger scale; Fig. 27 is a section taken on line 27—27 of Fig. 26; Fig. 28 is a perspective view of a movable platform forming part of the pin setting apparatus; Fig. 29 is a section taken on line 29—29 of Fig. 28, on a larger scale; and Fig. 30 is a perspective view of the ball cleaning device.

In the drawings the numeral 1 indicates the playing bed of the alley. This is bounded by sides 2, extending from the players' end of the alley to the rear end thereof, where they are somewhat higher, as clearly shown at 3. These higher portions of the alley's sides inclose with a cushion 4, the pin section of the alley, and also the pit 5 thereof. Upon the portions 3 of the sides are mounted four uprights 6, two on each side of the alley and carrying at their upper ends a horizontal stationary platform 7. A similar platform 8 is mounted upon the uprights a distance above the playing bed of the alley which corresponds to about three times the height of a bowling pin 9.

Below the platform 8 is mounted upon the uprights 6 a movable platform 10, shown in detail in Fig. 28 of the drawings. This last named platform is provided at its four corners with lugs 11, carrying anti-friction rollers 12, which are seated in vertical grooves 13, that are formed in the uprights 6 and in the portions 3 of the sides of the alley. In this manner the movable platform 10 is adapted to slide up and down, as will be described hereinafter. The movable platform is provided with ten substantially conical holes 14, in alinement with the pin spots 15 on the pin section of the alley. To the four corners of the movable platform 10 are attached flexible connections, consisting, as shown, of cables 16, which extend through registering openings 17 and 18 in the platforms 8 and 7, respectively, and run over sheaves 19, which are mounted in bearings 20, the latter being carried by the platform 7. The cables extend in the rear of the uprights 6, run thence downward in parallel relation to the said uprights and are attached to a counter weight 16', that is adapted to slide along the rear uprights. The counter weight is guided in its movement by lugs 16" thereon, which are seated in longitudinal grooves 6' in the inner faces of the said rear uprights. The counter weight is somewhat heavier than the movable platform 10.

An electric motor 21 is mounted upon the stationary platform 7, and is provided upon its shaft with a pulley 22, to which is attached one end of a cable 23, the other end of which is fastened to the counter weight.

The pin spots 15 are made each in the form of a metallic disk (shown in detail in Figs. 20 and 21 of the drawings). These disks are disposed within recesses 24 in the alley bed, their upper faces being flush with the alley bed, as clearly appears from Figs. 20 to 21. Each disk is provided in its exposed face with a depression 25, into which fits a projection 26 on the lower face of a pin 9. The depressions 25 and the projections 26 form, preferably, each part of a globular surface, the projections being somewhat smaller than the said depressions, so that the pins, when being set, find easily their places on the spots. Moreover, the pins, when struck, can easily be knocked down from their vertical positions. The projections 26 are, preferably, made in the form of screw plugs, that are located in recesses 27 in the pins, and each of the said plugs is provided within the said recesses with an eye 28, through which is drawn one end of a cable 29 and secured to its respective plug. These cables extend through longitudinal bores 30 in the pins and run thence through the conical holes 14 in the movable platform 10 and through registering holes 31 and 32 in the stationary platforms 8 and 7, respectively. Above the platform 7, each cable 29 runs over a sheave 33, that is mounted in bearings 34, the latter being carried by the platform 7. From there the cables 29 extend downward through holes 35 in the platform 7 and are each attached to slides 36, (shown in detail in Figs. 17 to 19, inclusive).

Each slide is guided in its movement by two arc-shaped parallel rails 37, which are disposed vertically and attached to the stationary platforms 7 and 8. Each of these slides is provided at its rear face with an upwardly extending nose 38, and below the said nose with a lug 39, carrying an outwardly extending anti-friction roller 40. With each slide is associated a weight 41, that is adapted to slide along the rails 37, and is disposed above the respective slide 36. Each of these weights is provided with a nose 42 at its upper rear corner, and with a lug 43, carrying an anti-friction roller 44. The cables 29 extend through bores 45 in the weights 41. The weights 41 are adapted to be held in their upper positions (immediately below the stationary platform 7) by spring-pressed latches 46, mounted upon the rails 37. One of these latches is shown in detail in Figs. 11 to 13, inclusive, and is shown as being made in the form of a bell crank lever 47, that is fulcrumed at 48 to a projection 49 on a rail 37. A spring 50 tends to force one arm, denoted by the numeral 51, of the bell crank lever through an aperture 52 in the rail 37, to which it is attached. The arm 51 is adapted to project into a recess 53 in the respective weight 41, thereby holding the said weight in its uppermost position. The bell crank levers 47 are mounted in the path of the noses 38 and 42 on the slides 36 and weights 41, respectively, for a purpose hereinafter to be described.

With each coacting slide 36 and weight 41 coöperate two levers 54 and 55, which are connected by a link 56. Each lever 54 is fulcrumed at 57 and each lever 55 at 58 to the respective rail 37. The respective link 56 is pivoted at 59 to the lever 54, and is provided with a longitudinal slot 60, in which is seated a pivot pin 61, the latter being carried by the lever 55. Each lever 55 is curved, as clearly appears from Figs. 5 to 9 inclusive, for the purpose hereinafter to be described. The levers 54 are adapted to coact with the anti-friction rollers 40 on the slides 36, and the levers 55 with the anti-friction rollers 44 on the weights 41.

The operation of the device so far described is as follows:—When the pins are on their spots, the movable platform 10 is in its uppermost position, and is held therein by the counter weight 16', which is somewhat heavier, as above described, than the said platform. The weights 41 are kept in their upper positions by the spring-pressed latches 46, and the slides 36 are held by the cables 29 a substantial distance below the said weights, all as shown in detail in Fig. 5 of the drawings. The levers 55 abut against the fulcrum pins 57 of the levers 54 as clearly appears from Fig. 5 of the drawings.

If a pin is struck by a ball and knocked down from its vertical position, the respective slide 36 moves on its rails 37 upward (Fig. 6), whereby its nose 38 comes into contact with the spring pressed latch 46 and unseats the arm 51 of the latter from the recess 53 in the weight 41, which is thus free to slide downward along the rails 37, carrying with it the slide 36. In this manner the respective pin 9 is lifted (Fig. 7). The anti-friction roller 40 on the slide 36 rides over the rounded free end 54' of the respective lever 54 (Fig. 7), whereby the slide is brought by the weight 41 into its lowermost position (Fig. 8), in which the free end of the lever 54 abuts against the antifriction roller 44 on the said weight, and the pin 9 projects through the respective conical hole 14 in the movable platform 10 (Fig. 8).

If it is desired to set the pins on the pin spots, the electric motor 21 is rotated in the direction of the arrow shown adjacent it in Fig. 1 of the drawings. This motor may be actuated from the bowlers' stand, by leading from it electric conductors to said stand and providing a switch at the proper place. When this motor rotates in the direction mentioned, the cable 23 is wound upon its pulley 22, thereby raising the counter weight 16'. This permits the platform 10 to descend by its own weight, carrying with it the pins and placing them on the pin spots. As the platform descends, the anti-friction rollers 40 on the slides 36 come into contact with the underfaces of the levers 54, the rounded ends 55' of the levers 55 having first ridden over the anti-friction rollers 44 on the weights 41. As the platform now descends farther, the rollers 40 on the slides 36 cause the levers 54 to swing around their fulcrums 57, which, in turn, cause the levers 55 to be brought into contact with the anti-friction rollers 44 on the weights 41. These weights are thus lifted toward their upper positions.

The fulcrums of the levers 54 and 55 are arranged and the levers 55 are curved in such a manner that the weights 41 rise quicker than the respective slides 36 (Fig. 9). As soon as the noses 42 on the weights 41 come into contact with the spring pressed latches 46, the latter are swung around their fulcrums, thereby withdrawing their arms 51 from the path of the said weights, and permitting the said arms to project into the recesses 53 in the weights, when the latter arrive at their uppermost positions. The platform descends farther and places the pins on the pin spots. The operation of the motor is then stopped, whereby the counter weight 16' is allowed to descend, unwinding its cable 23 from the pulley of the motor and raising the movable platform into the position shown in Fig. 5 of the drawings. The levers 54 and 55, on the other hand, return automatically by their own weight into the positions shown in Fig. 5 of the drawings.

When a pin is struck and brought in the manner above described into the position shown in Fig. 8 of the drawings, the respective slide 36 closes an electric switch 62 on the respective rail 37 (Fig. 8). From this switch lead electric conductors 63 to an incandescent lamp 64 on a board 65, that is held in vertical position in front of the pin section between the platforms 7 and 8. There are obviously as many incandescent lamps provided as there are pins, and their arrangement corresponds to that of the pin spots, as appears from Fig. 4 of the drawing. In this manner the players are able to determine the particular pin or pins which have been knocked from their vertical positions.

In the ball receiving pit 5 of the alley is formed a gutter 66, in which the balls roll toward an elevating mechanism 67, which lifts them into the return gutter 68 that is slightly slanting from the rear end of the alley toward the players' end thereof, so that the balls, when once in the return gutter, roll to the players' stand. One ball elevating mechanism may serve for two adjacent alleys, the gutters 66 of which lead to the same elevating mechanism.

The elevating mechanism comprises a housing 69, in rear of the gutter 66, the said housing being preferably of quadrangular cross-section and extending vertically from the gutter 66 upward a suitable distance above the return gutter 68. Within the housing 69 is mounted, to slide up and down, a car 70, that is guided in its movements by lugs 71, which are seated in vertical grooves 72 in the inner faces of the walls of said housing. This car is of considerable weight, for a purpose hereinafter to be described, and is provided with a bail-shaped member 73, to which is attached one end of a cable 74, the other end of which is fixed to the pulley 75 of an electric motor 76, that is mounted on top of the housing. To the car is pivoted at its front edge 77 a platform 78, having a recess 79 in its upper face, to receive a ball. The platform is provided with a forwardly extending projection 78', that is adapted to strike against a shoulder 80 on the return gutter 68, whereby the said platform is tilted, thereby automatically delivering the ball to the gutter 68.

The motor 76 is set automatically in motion when a ball rolls onto the platform 78. For this purpose electric conductors 81 and 82 lead from its brushes to a stationary contact point 83 and a movable contact point 84. The stationary contact point is carried by the car 70 and the movable contact point by the platform 78. The movable contact point extends through an opening 85 in the platform 78, and projects above the upper face thereof; a spring 86 tending to hold the movable contact point in its elevated position, in which the electric circuit is interrupted.

When the ball rolls from the gutter 66 onto the platform 78 through the open front end 87 of the housing 69, it depresses the movable contact point 84 and thereby closes the circuit of the motor 76. The shaft of this motor rotates in the direction of the arrow shown in Fig. 24 of the drawings, whereby the cable 74 is wound upon the pulley 75, and the car 70 elevated. When the projection 78' of the platform 78 strikes against the shoulder 80 on the return gutter 68, the platform is tilted and the ball rolls into the return gutter, to be returned by the latter to the players' platform. As soon as the ball rolls off the said platform, the spring 86 opens the electric circuit of the motor 76, whereby the car 70 with the platform 78 return to their lower positions, unwinding the cable 74 from the motor 76.

In the housing 69 is slidably disposed a shutter 88, which is guided in its movement by slots 89 in the sides of the housing. At its lower end this shutter carries an inwardly projecting lug 90, against which the car 70 is adapted to bear. A bail-shaped handle 91 is secured to the shutter, and to this handle is fastened one end of a cable 92, that runs over sheaves 93, and carries at its other end a counter-weight 94. When the car 70 is in its lowermost position (Fig. 24) the shutter is also in its lowermost position, in which its upper edge 95 is flush with the gutter 66. In this manner a ball is adapted to roll onto the platform 78. As the car is now being lifted, the counter-weight 94 causes the shutter to move upward, as far as the slots 89 will permit. When in its uppermost position, the shutter closes the outlet of the gutter 66, or, in other words, it prevents balls from rolling into the housing 69. As the car returns to its lowermost position, it carries with it the shutter, the weight of the car 70 and platform 78 being greater than that of the counter-weight 94.

In order to prevent unnecessary noises as the game is being played, the gutter 66 may be lined with cork sheets 96 (Fig. 27), or with similar noise-deadening material. The lower face of the movable platform 10 may also be provided with sheets 96, and so also the inner faces of the higher portions 3 of the sides of the playing bed.

The cushion 4, which is hinged to the alley, is stuffed with cotton, or similar material.

Near the players' stand the return gutter 68 is provided with a ball-cleaning device. This device comprises frames 97, which are substantially ring-shaped, and to which is attached a conduit 98, made of fur with its fur fibers inside. As a ball rolls down the return gutter, it passes through the conduit so formed and is cleaned by the fur.

What I claim is:

1. In a pin setting apparatus for bowling alleys, the combination with a supporting frame, of a platform extending across the alley bed shiftably mounted upon said frame, said platform being provided with holes in registering positions with the pin spots on the alley bed, means carried by said frame to effect the raising of said platform, means upon said frame to effect the lowering of said platform, a pair of rails associated with each hole in said platform and mounted upon said frame, a slide upon each pair of rails, a flexible connection attached to each slide and extending through the respective hole in said platform and secured to the respective bowling pin, a weight associated with each slide movably disposed upon the respective pair of rails, means for holding said weights in their uppermost positions, means carried by said slides for releasing said weights when said slides move toward said weights as pins are being knocked down from their vertical positions, and means acted upon by said slides for raising said weights when said platform is caused to move downward to setting position.

2. In a pin setting apparatus for bowling alleys, the combination with a supporting frame, of a platform extending across the alley bed shiftably mounted upon said frame, said platform being provided with holes in registering positions with the pin spots on the alley bed, means carried by said frame to effect the raising of said platform, means upon said frame acting upon said first named means to effect the lowering of said platform, a pair of rails associated with each hole in said platform and mounted upon said frame, a slide upon each pair of rails, a flexible connection attached to each slide and extending through the respective hole in said platform and secured to the respective bowling pin, a weight associated with each slide movably disposed upon the respective pair of rails, means for holding said weights in their uppermost positions, means carried by said slides for releasing said weights when said slides move toward said weights as pins are being knocked down from their vertical positions, and means acted upon by said slides for raising said weights when said platform is caused to move downward to setting position.

3. In a pin setting apparatus for bowling alleys, the combination with a supporting frame, of a pair of rails mounted thereon, a slide upon said rails, a flexible connection attached to said slide and to a bowling pin, a weight movably disposed above said slide, means for holding said weight in its raised position, means carried by said slide for releasing said weight, and means acted upon by said slide for raising said weight when said slide is caused to move toward its upper position.

4. In a bowling alley, the combination with a gutter in the ball receiving pit of the alley, of a return gutter disposed a substantial distance above said first-named gutter, an elevating mechanism receiving the balls from the pit gutter and delivering them to the return gutter, an electric motor for actuating said elevating mechanism, and circuit closing means upon said elevating mechanism adapted to close the circuit of said motor by the weight of a ball resting on said elevating mechanism.

5. In a bowling alley, the combination with a gutter in the ball receiving pit of the alley, of a return gutter disposed a substantial distance above said first-named gutter, an elevating mechanism including a car and a platform pivoted thereto adapted to receive the balls from the pit gutter and deliver them to the return gutter, an electric motor for actuating said elevating mechanism, circuit closing means upon said car and platform adapted to close the circuit of said motor by the weight of a ball on said platform, and means on said return gutter for tilting said platform when it arrives in position to deliver the ball to said return gutter.

Signed at New York, in the county of New York and State of New York, this 10th day of August, A. D. 1917.

JULIUS FEKETE.